United States Patent [19]
Areso

[11] Patent Number: 5,885,634
[45] Date of Patent: *Mar. 23, 1999

[54] COLLAGEN FILM HAVING IMPROVED EXTENSIBILITY

[75] Inventor: Carlos Longo Areso, Pamplona, Spain

[73] Assignee: Viscofan, Industria Navarra de Envolturas Celulosicas, S.A., Pamplona, Spain

[ * ] Notice: This patent issued on a continued prosecution application filed under 37 CFR 1.53(d), and is subject to the twenty year patent term provisions of 35 U.S.C. 154(a)(2).

[21] Appl. No.: 719,991

[22] Filed: Sep. 25, 1996

[30] Foreign Application Priority Data

Sep. 28, 1995 [ES] Spain ...................................... 9501871

[51] Int. Cl.$^6$ ............................. A23J 3/04; A23L 1/314; A23P 1/08
[52] U.S. Cl. ............................. 426/87; 426/92; 426/105; 426/140
[58] Field of Search ................................ 426/92, 140, 87, 426/105

[56] References Cited

U.S. PATENT DOCUMENTS

| | | | |
|---|---|---|---|
| 3,446,633 | 5/1969 | Talty | 426/140 X |
| 3,890,447 | 6/1975 | Shatney | 426/105 |
| 3,961,082 | 6/1976 | Winkler | 426/140 X |
| 3,961,085 | 6/1976 | Winkler et al. | 426/140 X |
| 4,115,594 | 9/1978 | Higgins et al. | 426/140 |
| 4,117,171 | 9/1978 | Higgins | 426/140 |

*Primary Examiner*—Arthur L. Corbin
*Attorney, Agent, or Firm*—Notaro & Michalos P.C.

[57] ABSTRACT

The invention seeks to obtain a collagen film with improved extensibility characteristics, preventing or diminishing the structural rigidity of collagen films of this kind. This purpose is achieved by providing such collagen with an oily additive, such as oils or fats, thereby rendering such films suitable to be used in ham stuffing machines. This beneficial effect is obtained when the addition of oily additives lies between 1 and 60% of the collagen contents measured as a dry extract of the film.

8 Claims, 2 Drawing Sheets

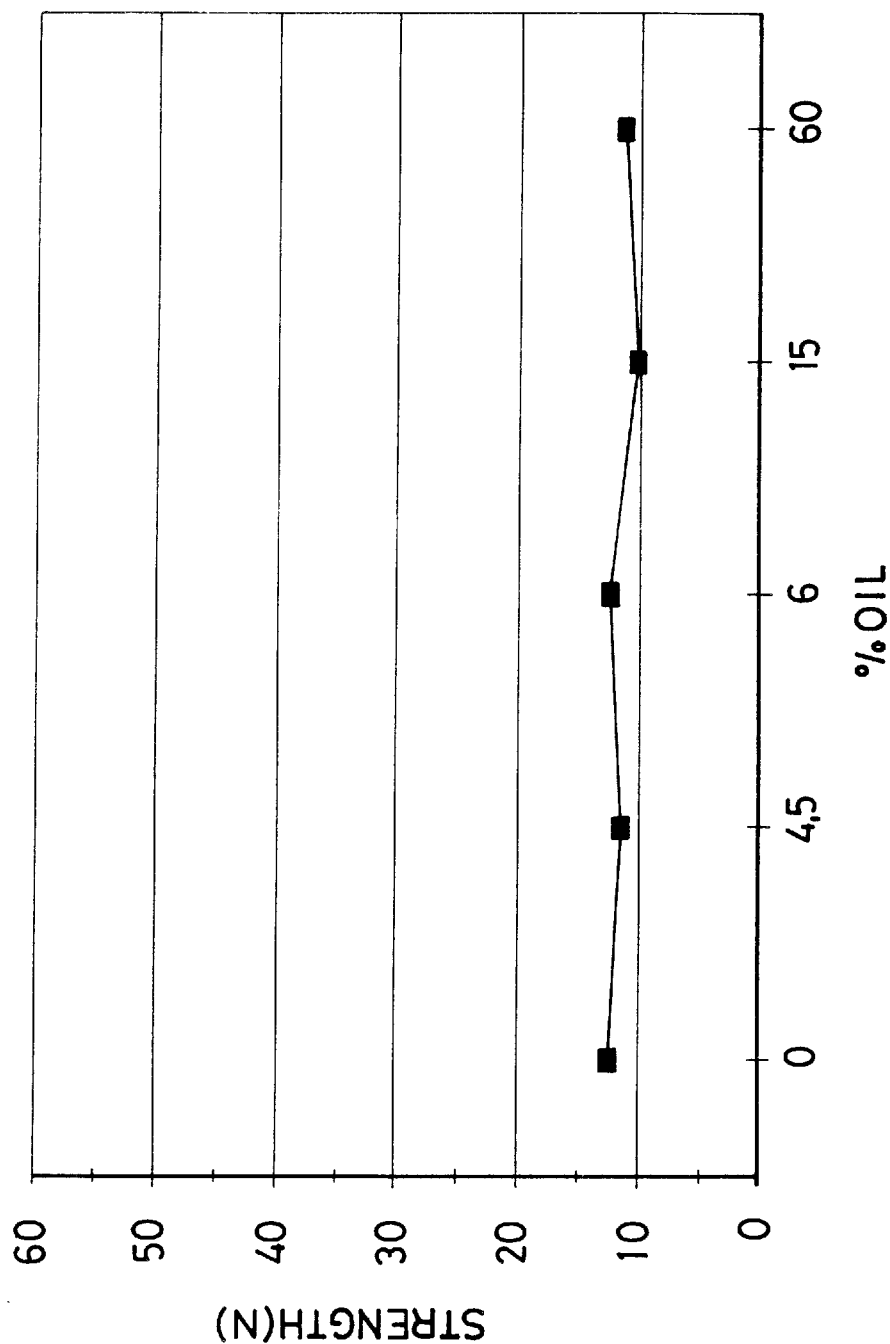

COLLAGEN FILM HAVING IMPROVED EXTENSIBILITY

OBJECT OF THE INVENTION

The object of the present invention is a collagen film with improved extensibility characteristics so as to accommodate itself to the modernmost current meat product manufacturing techniques which are increasingly demanding on films of this kind.

The great problem that currently exists with collagen films lies in the considerable number of times the film is severed whilst used in meat product encasing machines because it is endeavoured that productions be increasingly higher, demanding an ever-increasing yield of materials. These ruptures result in countless failures in the manufacturing process and consequently a wastage of time, material and thus money in production processes.

The purpose of the invention is to obtain a collagen film having improved extensibility characteristics over current films, preventing the undesirable severing of such films, thereby for there to be no failures for such reason, and for an enhanced productivity to be achieved, resulting in a considerable cost savings.

BACKGROUND OF THE INVENTION

Edible collagen films and casings are known in the current meat product manufacturing art, which have come to replace limited traditional animal tripes. In this sense, German Patent DE-642,922 discloses a collagen film manufacturing process.

Generally speaking, collagen casings are made of a number of components, amongst which collagen as such is predominant, but which include a glycerol mixture that proportionally represents close to 17%, a small quantity of Sorbitol, approximately 2%, and water representing approximately 12%.

For some products, such as hams and the like, rather than using traditional tubular casings, films employed are dispensed in reeled fashion which, when in use, are unreeled with their ends overlapping, thereby to encase the meat product to be prepared. This applies especially to cooked hams which are encased in a net which gives the product shape and consistency before being cooked.

The problem with these netted meat products lies in that, after being cooked, the net sticks to the outside of the processed product, and either bits of net stick to the meat product or the net pulls bits off the product on being removed, which product loses material and has its appearance damaged, rendering it inadequate to be sold.

The current advantageous solution of inserting a thin edible collagen film between the meat mass and the net was arrived at in order to prevent these problems, enabling the net to be easily detached from the products. Furthermore, due to the proteic nature of the collagen film, when it undergoes cooking or smoking, the collagen becomes intimately linked to the meat and is almost impossible to identify or detach from the meat mass, since it is transparent and has no taste, forming an oily product. Said collagen film does not stick to the net in which cooking or smoking takes place, and the product therefore has a good appearance after the net is removed, since no surface loss will have ensued on the meat. In addition, with this collagen film in between, the surface of the meat mass is better protected against any damage it might suffer, loss of juices during cooking is reduced and the external appearance of the product thus netted is improved.

The collagen is usually supplied with a continuous length, a width between 300 mm and 600 mm and a thickness between 0.015 and 0.035 mm. Commercial products of these characteristics are sold, for instance, by the firm Naturin GmbH & Co. under the "Coffi" trade mark.

German Patent DE-3,431,521 of the firm NATURIN-WERK BECKER & CO. is known to comprise a cooked meat product manufacturing process and a mechanism to manufacture such cooked and netted meat products. This invention proposes the application on the raw or previously tied pieces of meat of a coating consisting of an edible collagen layer, and a longitudinally and/or transversely elastic mesh or net is arranged upon such coating, and thereafter the meat goes through a cooking process. In order to prevent the collagen film from severing when the mesh or net is applied, this invention makes provision for both layers, i.e. the net and collagen, to be applied simultaneously, thereby preventing the collagen layer from being damaged at that time.

However, although advantageous, because of stresses existing in modernmost production processes, stretching the elements used to a limit, and above all due to the varying performances of the elastic net and the collagen, the films are still rather frequently severed.

Products capable of improving the extensibility conditions of the collagen film to which they are applied have been used in an attempt at solving these severance problems. It has been found that a thicker film does not improve the extensibility characteristics and hence does not prevent severance. Similarly, increasing percentages of plasticizers, such as glycerine, sorbitol and the like, does not yield satisfactory results since the two overlapping contacting sheets stick to each other, though extensibility is improved.

Obtaining a film having improved extensibility characteristics without undesirable side-effects such as sticking, has been approached by adding an oily component to the collagen mass or to the film after extrusion.

Oily components have been used in other applications providing collagen-based products with characteristics differing from the object of the invention. Thus, for instance:

U.S. Pat. No. 3,446,633 claims the use of edible oil in tubular collagen casing production batches to provide the casing with a more translucent character.

U.S. Pat. No. 3,567,467 claims the use of edible oil with an antioxidant in collagen casing treatment baths to allow for a long storage period.

U.S. Pat. No. 3,627,542 claims the use of a softener comprising a monoglyceride or acetylated monoglycerides, applied to casing treatment baths.

U.S. Pat. No. 4,061,787 claims the use of unsaturated fatty acids as tanning or cross-linking agents for collagen casings.

U.S. Pat. No. 4,115,594 claims the use of an additive containing a sorbitan ester and polyoxyethylene before extrusion of the casing in order to obtain a better dispersion of the cellulose fibres used in making casings, and to improve the folding properties.

U.S. Pat. No. 4,117,171 claims the use of polyol esters and fatty acids and mineral oils to improve the tubular casing antiblocking characteristics, preventing their inner walls from sticking in the tanning process undergone in the various baths before drying.

These inventions all relate to the application of various products to tubular casings in an attempt to improve particular characteristics thereof.

They all provide for the use of claimed components in casings which are treated by means of tanning and/or plasticizing baths before drying.

Reference should lastly be made in regard to prior in art, to Canadian Patent CA-1,253,387 which claims the use of collagen sheets soaked in oil and used dry to encase smoked meat products, in contrast to the use of such sheets after being dipped in water, which resulted in a lesser resistance thereof to tear.

The addition of an oily product to a collagen film applied to a meat product having substantial water contents has been found to provide the film with the desired extensibility characteristics, without the adverse effect of reducing its resistance.

DESCRIPTION OF THE INVENTION

It is common in modern automated netted and encased meat production plants to considerably increase their production speed to achieve a greater productivity, the great problem that currently exists being that speed is limited to the inevitable and most frequent severing of collagen films, for it is a scarcely extensible material and cannot endure the high stresses and speed changes typical of these machines in their production process.

It is therefore necessary to provide these collagen films with characteristics which prevent such constant severing, that everyday practice has shown to be due to the existing stresses in meat product stuffing or netting machines, since such films must pass through successive rollers which encase the product. It has also been shown that in spite of collagen films being used with increased mechanical strength, they are still invariably severed and the conclusion arrived at is that such is to the structural rigidity of such films.

The aim is consequently to try and provide such films with characteristics eliminating or diminishing such structural rigidity typical of collagen films, providing them with an extensibility that may prevent films from being severed when used in current machines.

It has surprisingly been found that the resilience of such films is successfully increased by adding an oily additive, such as oils or fats, to the collagen, thereby rendering the films better suited to be used in ham stuffing or netting machines. The characteristics of the film, such as its resistance, remain almost the same, whereas the physical characteristics have surprisingly changed and a substantial increase is achieved in product extensibility.

This beneficial effect of the addition of oily additives has been found to result when the percentage lies between 1 and 60% of the collagen contents, measured as a dry film extract, and preferably its greatest effect arises when such percentage lies between 3 and 40%.

With percentages under 1%, the film extensibility characteristics barely differ with respect to film without oily additives, having minimal extensibility characteristics. With percentages above 40%, however, the film becomes extremely extensible, much like rubber, and its mechanical strength is undesirably reduced, becoming wholly unsuited when oily additive percentages above 40% over the collagen contents measured as a dry extract are added.

Among the oils and/or fats used, it has been found that animal oils and/or fats, vegetable oils and/or fats, mineral oils and/or fats, silicone oils, alkylene oxide addition products and partial fatty acid esters are appropriate.

In the circumstances, the object of the invention is a film having improved extensibility characteristics, obtained by adding oily additives to the collagen mass.

The invention also covers the process to manufacture such film with improved extensibility characteristics.

The process also includes the meat product made with a film thus characterised and prepared using the process above-mentioned.

The film subject of the invention with improved extensibility characteristics obtained by adding oily additives has been shown to be equally appropriate when such film is perforated, thereby allowing the air trapped in the meat product manufacturing process out through the holes.

This film has also been shown to continue to have wholly appropriate physical qualities when it is coloured by any traditional methods, either adding colour to the collagen mass before being extruded or supplying colour at a stage subsequent to the film being made, either through a colour bath or by spraying the colour onto the previously obtained film.

This film has also been shown to continue to have wholly appropriate physical qualities when other substances are added to it, such as spices providing the end product with taste and/or smell.

Said film is moreover still suitable to be provided with any traditional impression of the kind that is usually provided thereon, the oily additive having no effect on the printability characteristics of the film.

It has been surprisingly found that a collagen film with the improved extensibility characteristics obtained by adding an oily additive to the collagen is not overly affected by moisture, as is the case of traditional collagen film, i.e. moisture is more slowly absorbed into it due to the actual inclusion of the oily additive, being unlike traditional films which are noteworthy for their eagerness for water, resulting in the absorption of atmospheric humidity or moisture that is frequently found in places where meat products of this kind are usually produced, thereby losing part of their fundamental characteristics, resulting, as is traditionally the case, in a blocking effect, i.e. the film sticks to itself or to parts of the machine with which it is in contact.

As explained above, the invention also deals with the process to make such collagen films and particularly the process consisting of adding such oily additive to the collagen to obtain a film with improved extensibility characteristics.

Tests have shown that the oily additive provides the film with suitable extensibility characteristics, whether the oily additive is added to the collagen mass before extrusion or at the extrusion nozzle proper. Addition of the oily additive to the collagen mass before extrusion and at the actual extrusion nozzle can be carried out by any traditional method.

Satisfactory tests have also been made adding such oily additives after the film is extruded, due to the porosity of such collagen films, which are quickly soaked with the oily additives. Addition of the oily additive to the previously extruded film can be carried out by any traditional method, namely for instance by dipping or spraying.

A final object of the invention is the meat product prepared with a collagen casing or film having improved extensibility characteristics, as well as a meat product prepared with a casing or film obtained in a process for providing improved extensibility characteristics, the cover extending to any meat products whatsoever such as hams, sausages, salami, and so forth.

PREFERRED EMBODIMENT OF THE INVENTION

The examples disclosed in this invention have been carried out taking traditional collagen film as a base, i.e. film without any oily additives and comparing the same with different samples obtained by adding an oily product, Dynacet 285 type oil (Huls Adtiengesellschaft, Troisdorf, Germany), tests having been made to compare the resistance and extensibility of such films.

In order to carry out such tests, ten rectangular samples measuring 3 by 11.5 centimetres cut lengthwise from the film were taken from each of the extruded films. The samples thus obtained from each film were conditioned and stabilised for 2 hours in a climatic chamber at 70% humidity and 25° C. The samples obtained and stabilised thus were tested in a UTS-3 machine (UTS test systems GmbH, Ulm, Germany) arranging the samples between clips spaced 6 centimetres away from each other. These clips were separated at a speed of 100 mm/minute and the various resistance and extensibility values obtained were recorded, defined as follows:

Extensibility: Percentage increase in separation between clips or clamps from the start of the test until the film is severed.

Resistance: Force used to cause the film to sever, expressed in Newtons.

EXAMPLE 1

The first example was carried out with a traditional collagen film, its composition affording the following results for a 10 kg collagen film sample:

|  | Kg | % |
| --- | --- | --- |
| COLLAGEN | 6.69 | 66.9 |
| GLYCEROL | 1.765 | 17.65 |
| SORBITOL | 0.25 | 2.5 |
| WATER | 1.178 | 11.78 |
| OTHER | 0.117 | 1.17 |
| TOTAL | 10 | 100% |

The mean results obtained from the physical samples tested were as follows:

| EXTENSIBILITY | 21% |
| --- | --- |
| RESISTANCE | 12.4N |

EXAMPLE 2

The second example or test carried out comprised making a film, starting with the basic components for preparing a traditional collagen film, to which 3% oil was added to obtain the following composition:

|  | Kg | % |
| --- | --- | --- |
| COLLAGEN | 6.69 | 64.95 |
| GLYCEROL | 1.765 | 17.14 |
| SORBITOL | 0.25 | 2.43 |
| OIL | 0.3 | 2.91 |
| WATER | 1.178 | 11.43 |
| OTHER | 0.117 | 1.14 |
| TOTAL | 10.3 | 100% |

This 3% oil percentage added is approximately 5% of the collagen contents measured as a dry extract.

The mean results obtained from the physical samples tested were as follows:

| EXTENSIBILITY | 29.4% |
| --- | --- |
| RESISTANCE | 11.4N |

EXAMPLE 3

The third example or test carried out comprised making a film, starting with the basic components for preparing a traditional collagen film, and 4% oil was added to the remaining products used in the composition, the following composition being obtained:

|  | Kg | % |
| --- | --- | --- |
| COLLAGEN | 6.69 | 64.33 |
| GLYCEROL | 1.765 | 16.97 |
| SORBITOL | 0.25 | 2.4 |
| OIL | 0.4 | 3.85 |
| WATER | 1.178 | 11.32 |
| OTHER | 0.117 | 1.13 |
| TOTAL | 10.4 | 100% |

The mean results obtained from the physical samples tested were as follows:

| EXTENSIBILITY | 30.2% |
| --- | --- |
| RESISTANCE | 12.3N |

This 4% oil percentage added is approximately 6% of the collagen contents measured as a dry extract.

EXAMPLE 4

The fourth example or test carried out comprised making a film, starting with the basic components for preparing a traditional collagen film, and 10% oil was added to the remaining products used in the composition, the following composition being obtained:

|  | Kg | % |
| --- | --- | --- |
| COLLAGEN | 6.69 | 60.82 |
| GLYCEROL | 1.765 | 16.05 |
| SORBITOL | 0.25 | 2.27 |
| OIL | 1 | 9.09 |
| WATER | 1.178 | 10.71 |
| OTHER | 0.117 | 1.06 |
| TOTAL | 11 | 100% |

The mean results obtained from the physical samples tested were as follows:

| EXTENSIBILITY | 36.5% |
| --- | --- |
| RESISTANCE | 10.1N |

This 10% oil percentage added is approximately 15% of the collagen contents measured as a dry extract.

EXAMPLE 5

The third example or test carried out comprised making a film, starting with the basic components for preparing a traditional collagen film, and 40% oil was added to the remaining products used in the composition, the following composition being obtained:

|  | Kg | % |
| --- | --- | --- |
| COLLAGEN | 6.69 | 47.78 |
| GLYCEROL | 1.765 | 12.6 |
| SORBITOL | 0.25 | 1.79 |
| OIL | 4 | 28.57 |
| WATER | 1.178 | 8.41 |
| OTHER | 0.117 | 0.85 |
| TOTAL | 14 | 100% |

The mean results obtained from the physical samples tested were as follows:

| EXTENSIBILITY | 32.8% |
| --- | --- |
| RESISTANCE | 11.2N |

This 40% oil percentage added is approximately 60% of the collagen contents measured as a dry extract.

The addition of greater quantities of oil was found to be ineffective insofar as extensibility was concerned, rendering the product unwieldy due to excess fat or oil contents. The film obtained thus was weak and could hardly be used to encase hams.

The following comparative chart may be drawn up to summarise these examples in which column one shows the oil added over the rest of the products used in the composition, column two shows the percentage of such oil as regards the dry extract collagen contents and the last two columns show extensibility expressed in percentages and film resistance expressed in Newtons.

| % OIL TO MASS | % OIL TO COLLAGEN | EXTENSIBILITY (%) | RESISTANCE (N) |
| --- | --- | --- | --- |
| 0 | 0 | 21 | 12.4 |
| 3 | 4.5 | 29.4 | 11.4 |
| 4 | 6 | 30.2 | 12.3 |
| 10 | 15 | 36.5 | 10.1 |
| 40 | 60 | 32.8 | 11.2 |

BRIEF DESCRIPTION OF FIGURES

The figures attached hereto show graphs comparing collagen film extensibility, FIG. 1, and resistance, FIG. 2. These same figures show that extensibility decreases with oil proportions close to 60% over dry collagen.

To obtain said film with the improved extensibility characteristics, the oily additive is added to the collagen mass both before extrusion and at the extrusion nozzle proper, by any traditional method.

Figure 1:
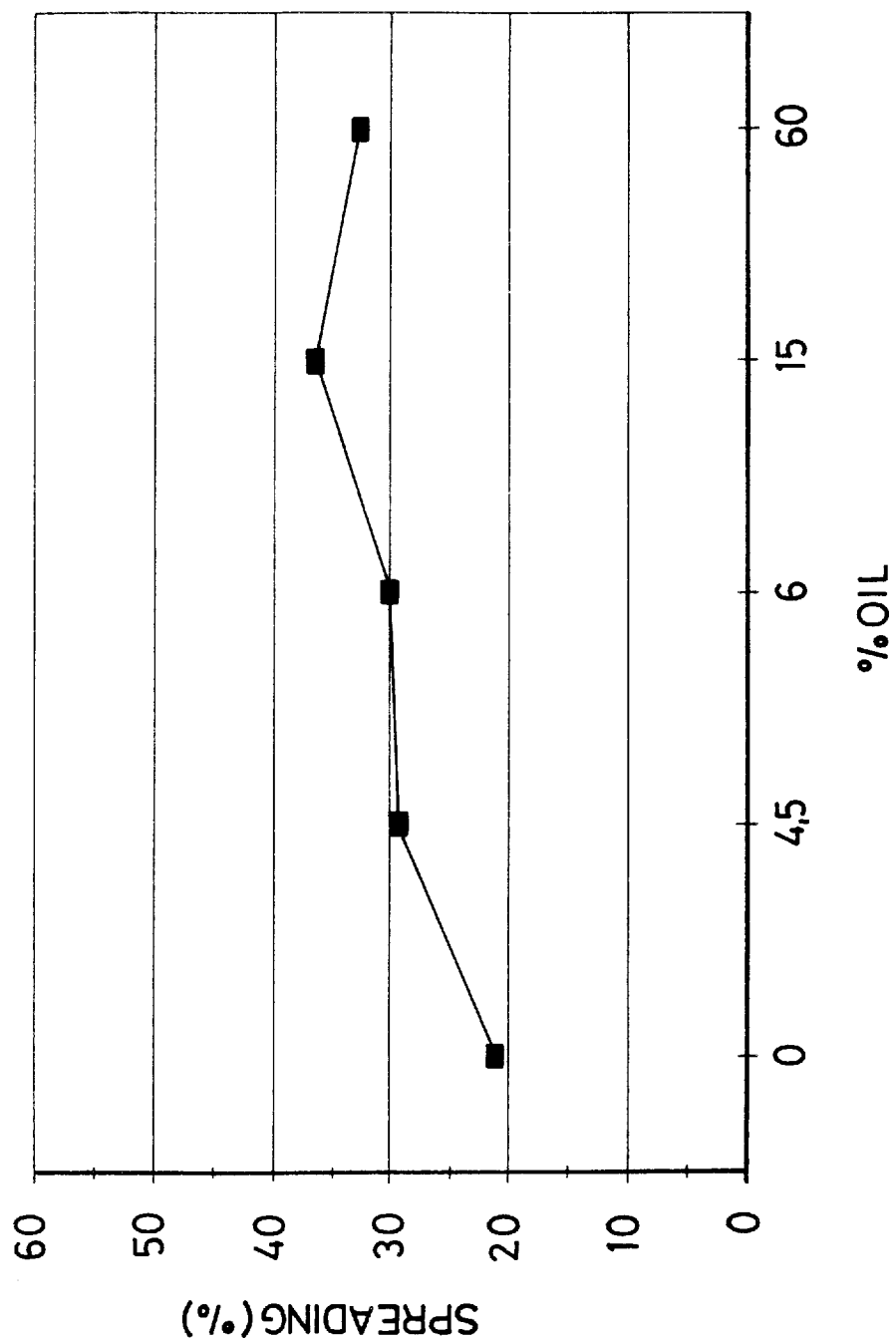

Said oily product can similarly be added once the film has been extruded, which addition can be made by any known traditional method such as dipping or spraying.

I claim:

1. A collagen film for enclosing meat food products which are subsequently surrounded by a netting and for preventing the netting from sticking to the meat food products for easy removal of the netting, the collagen film comprising: collagen and an oily additive incorporated into the collagen, the oily additive being present in an amount from between 1% and 60% of the collagen content by weight measured as a dry extract, the collagen film being rectangular and having an extensibility greater than 21%.

2. A collagen film according to claim 1, including, in combination with the film, meat enclosed in the film.

3. A collagen film according to claim 1, wherein the oily additive comprises at least one member of the group consisting of animal oils or fats, vegetable oils or fats, mineral oils or fats, silicone oils, alkylene oxide addition products and partial fatty acid esters.

4. A collagen film according to claim 3, wherein the oily additive is present in an amount from between 3% and 40% of the collagen content by weight measured as a dry extract.

5. A collagen film according to claim 1, wherein the film is perforated to allow air trapped during processing of a meat product to escape.

6. A collagen film according to claim 1, wherein the film is colored.

7. A collagen film according to claim 1, wherein the film has printing thereon.

8. A collagen film according to claim 1, further comprising spices.

* * * * *